(12) United States Patent
Gustafsson Vallander et al.

(10) Patent No.: US 10,584,760 B2
(45) Date of Patent: Mar. 10, 2020

(54) FLOW ADJUSTING DEVICE

(71) Applicant: ÖHLINS RACING AB, Upplands Väsby (SE)

(72) Inventors: Leif Gustafsson Vallander, Rodeby (SE); Torkel Sintorn, Vaxholm (SE); Johan Jarl, Sollentuna (SE); Erik Ladufjäll, Upplands Väsby (SE)

(73) Assignee: ÖHLINS RACING AB, Upplands Väsby (SE)

( * ) Notice: Subject to any disclaimer, the term of this patent is extended or adjusted under 35 U.S.C. 154(b) by 0 days.

(21) Appl. No.: 15/526,675

(22) PCT Filed: Nov. 13, 2015

(86) PCT No.: PCT/EP2015/076589
§ 371 (c)(1),
(2) Date: May 12, 2017

(87) PCT Pub. No.: WO2016/075299
PCT Pub. Date: May 19, 2016

(65) Prior Publication Data
US 2017/0321781 A1    Nov. 9, 2017

(30) Foreign Application Priority Data

Nov. 13, 2014    (EP) .................................. 14192985

(51) Int. Cl.
*F16F 9/46*    (2006.01)
*F16F 9/56*    (2006.01)
(Continued)

(52) U.S. Cl.
CPC .............. *F16F 9/56* (2013.01); *B62K 25/08* (2013.01); *F16F 9/348* (2013.01); *F16F 9/46* (2013.01);
(Continued)

(58) Field of Classification Search
USPC ....... 188/266.3, 278, 282.1–282.9, 285–287, 188/319.1, 319.2; 280/275, 276;
(Continued)

(56) References Cited

U.S. PATENT DOCUMENTS

| 3,344,894 A | 10/1967 | Kenworthy |
| 4,606,440 A * | 8/1986 | Buchanan, Jr. ......... F16F 9/467 188/266.4 |

(Continued)

FOREIGN PATENT DOCUMENTS

| DE | 4025880 A1 | 2/1992 |
| DE | 4407754 A1 | 9/1994 |

(Continued)

OTHER PUBLICATIONS

International Search Report and Written Opinion for International Application No. PCT/EP2015/076589, dated Jan. 20, 2016 (11 pages).

(Continued)

*Primary Examiner* — Christopher P Schwartz
(74) *Attorney, Agent, or Firm* — Kagan Binder, PLLC

(57) ABSTRACT

The present invention relates to a flow adjusting device (1) for a shock absorber for a vehicle, the shock absorber comprising a cylinder (21) and a piston (22) dividing the cylinder into at least a first and a second working chamber (23,24). The flow adjusting device is adapted to control at least a first damping medium flow (F1) and a second damping medium flow (F2) adapted to flow from at least one of the working chambers and comprises at least a first valve (2), adapted to control the first flow, and a second valve (3), adapted to control the second flow. The first valve and said second valve are jointly adjusted. The present invention further relates to a shock absorber comprising such a device and a front fork comprising such a shock absorber.

19 Claims, 11 Drawing Sheets

(51) Int. Cl.
*F16F 9/348* (2006.01)
*B62K 25/08* (2006.01)
*B62K 25/04* (2006.01)

(52) U.S. Cl.
CPC ........ *F16F 9/461* (2013.01); *B62K 2025/047* (2013.01)

(58) Field of Classification Search
USPC ................. 137/503, 512.1; 267/220, 221
See application file for complete search history.

(56) References Cited

U.S. PATENT DOCUMENTS

| | | | | |
|---|---|---|---|---|
| 5,139,119 A * | 8/1992 | Karnopp | ............... | B60G 17/08 137/503 |
| 5,193,655 A * | 3/1993 | Sasaki | ................... | F16F 9/468 188/266.4 |
| 5,404,973 A * | 4/1995 | Katoh | ................... | F16F 9/468 188/282.1 |
| 5,833,037 A * | 11/1998 | Preukschat | ............ | F16F 9/466 188/299.1 |
| 6,102,171 A * | 8/2000 | Rottenberger | .......... | F16F 9/325 137/512.1 |
| 6,382,370 B1 * | 5/2002 | Girvin | ................... | B62K 25/04 188/299.1 |
| 6,604,751 B2 * | 8/2003 | Fox | ........................ | B62K 25/04 188/275 |
| 7,699,146 B1 * | 4/2010 | Becker | .................... | F16F 9/446 188/275 |
| 7,722,069 B2 * | 5/2010 | Shirai | .................... | B62K 25/08 188/282.2 |
| 8,672,106 B2 * | 3/2014 | Laird | ..................... | B62K 25/08 188/275 |
| 8,807,542 B2 * | 8/2014 | Galasso | .................. | F16F 9/06 267/64.15 |
| 2009/0000885 A1 * | 1/2009 | McAndrews | ........... | F16F 9/504 188/275 |
| 2009/0000887 A1 * | 1/2009 | McAndrews | ........ | B62K 25/286 188/275 |
| 2016/0123425 A1 * | 5/2016 | McNab | ..................... | F16F 9/48 267/221 |

FOREIGN PATENT DOCUMENTS

| | | |
|---|---|---|
| EP | 0668175 A1 | 8/1995 |
| GB | 2236574 A | 4/1991 |
| JP | H07332426 A | 12/1995 |

OTHER PUBLICATIONS

E-Space English Language Abstract for DE 4025880.
E-Space English Language Abstract for JP H07332426.
Communication Pursuant to Article 94(3) EPC for European Application No. 14192985.1, dated Nov. 21, 2019 (4 pages).

* cited by examiner

FLOW ADJUSTING DEVICE

CROSS-REFERENCE TO RELATED APPLICATIONS

This application claims priority to International Application No. PCT/EP2015/076589, filed Nov. 13, 2015, and titled "FLOW ADJUSTING DEVICE", which in turn claims priority from European Application having Ser. No. 14/192, 985.1, filed on Nov. 13, 2014, both of which are incorporated herein by reference in their entireties.

TECHNICAL FIELD

The present specification generally relates to the field of shock absorbers for vehicles and in particularly discloses a shock absorber comprising a flow adjusting device.

TECHNICAL BACKGROUND

Shock absorbers and damping systems are used for damping of the relative movement between the wheel and the chassis of a vehicle, such as a car, a motorcycle or a bicycle. A conventional shock absorber normally comprises a working cylinder filled with a damping fluid, such as hydraulic oil or gas, and a piston arranged in the cylinder. The damper may then be arranged to move telescopically between the vehicle chassis and the wheel. The movement of the wheel and vehicle is thus damped by the piston moving in the cylinder against the resistance of the fluid, which further causes damping fluid to move in the damping cylinder. In the specific case of a bicycle, or mountain bike, dampers may be arranged in a front fork arrangement and/or between the driver and the rear part of the bike, in either case damping impacts and vibrations with respect to the driver.

Further, the shock absorber may comprise means for controlling the damping force exerted due to the flow of fluid through the damper. Such means may include different types of valve arrangement. In high end dampers, the amount of fluid allowed to pass for example through the piston and therefore the characteristics of the damper may be controlled by using manually or automatically adjustable valves of different types.

It is also known to use several flows and/or valve arrangements comprising several valves adapted to control the flow at different speeds. For example, a so called high-speed valve may be used to control the flow through the piston at high speed, whereas a so called bleed-flow may be used to allow for a flow between working chambers at lower speed when the main flow/high speed valve is closed.

For applications in the field of mountain bikes, the special situation arises that efficient damping is associated with the problem of the damping system absorbing pedalling energy from the rider. Thus, it may be desirable during some riding conditions, for example when travelling uphill, to lock the damping system such that no pedalling energy is lost to the damping system. This is sometimes referred to in the art as a so called lock-out of the damping system. Such lock-out states are preferably activated by the driver when desired and aims at balancing the need for damping versus the need for efficient pedalling, depending on the riding conditions.

For example, WO05052406 discloses an example of a lock-out system for a bicycle. The system comprises a lock-out valve operable by the rider combined with a blow-off valve.

WO0115964 discloses another example of a lock-out system. The system comprises a manually adjustable lock-out valve and an adjustable blow-off valve for controlling damping characteristic suitable for different driving conditions and a piston with a primary and a secondary channel. The blow-off valve is adjustable between a locked and an open position in order to allow or prevent a flow through the secondary channel.

However, the use of two adjustable valves greatly increases the complexity of the operation of the system for the rider, and in order to achieve a locked, or stiff, shock absorber when desired, the rider must adjust both valves into a locked or closed state.

The inventors of the present invention have identified a need for an improved shock absorber for a vehicle. There is a need for a shock absorber which is adjustable between different states of operation and which is easily adjusted between for example a locked state and a state wherein damping is provided to the vehicle.

Thus, an object of the present invention is to provide a shock absorber with adjustable damping properties. A further object is to provide a shock absorber which has an efficient lock-out state allowing the use of all pedaling energy for forward propulsion. Yet another object is to provide a shock absorber which is easy to use and which provides for a simple and reliable adjustability of the damping properties.

SUMMARY OF THE INVENTION

The above-mentioned requirements are achieved by the present invention according to the independent claims. Preferred embodiments are set forth in the dependent claims.

For example, one aspect of the invention relates to a flow adjusting device for a shock absorber for a vehicle. The shock absorber comprises a cylinder adapted to accommodate at least a hydraulic fluid and a piston dividing said cylinder into at least a first and a second working chamber. The flow adjusting device is adapted to control at least a first damping medium flow and a second damping medium flow adapted to flow from at least one of the working chambers, wherein the flow adjusting device comprises at least a first valve, adapted to control said first flow, and a second valve, adapted to control said second flow. The first valve and the second valve are jointly adjusted.

The invention is based on the insight that jointly adjusting the first and the second valve, and thereby a first and second fluid flow from at least one of the working chambers, allows for easy and efficient adjustability of the damping properties of the damper as well as for a more efficient "lock-out", or locked state, of the damper. The flow adjusting device may therefore advantageously be used with a shock absorber for a vehicle in order to increase driving efficiency as well as usability for the rider. Additional further developments will be apparent from the following aspects and embodiments of the invention as well as from the appended claims.

According to a first aspect of the present invention, a flow adjusting device for a shock absorber for a vehicle is provided. The shock absorber comprises a cylinder adapted to accommodate at least a hydraulic fluid and a piston dividing said cylinder into at least a first and a second working chamber. The flow adjusting device is adapted to control at least a first damping medium flow and a second damping medium flow adapted to flow from at least one of the working chambers, wherein the flow adjusting device comprises at least a first valve, adapted to control said first flow, and a second valve, adapted to control said second flow. The first valve and the second valve are jointly adjusted.

Thus, the first valve is adapted to control the first flow and the second valve is adapted to control the second flow, and the fluid flows may then be jointly adjusted using the flow adjusting device. The flow adjusting device is advantageously arranged in a location chosen in order to make the shock absorber design as space efficient as possible, while at the same time achieving a satisfactory flow of fluid from the at least one of the working chambers. Depending on the application, placements for the device may include a position adjacent to one of the working chambers, a position external from the cylinder a position separate from the cylinder and connected via a pipe or the like or on or near the piston. The first and second valve may be the same type of valve, or different types of valves adapted to the characteristics of the first and second fluid flow and/or adapted to perform different functionalities of the damper depending on the application. Thus, the flow adjusting device may be easily adapted to suite different riders and/or conditions.

According to one embodiment, the first valve is adjustable between at least a first position in which the first flow of fluid is allowed to flow substantially free through the first valve and a second position in which the first flow of fluid is substantially blocked from flowing through the first valve, and the second valve is adjustable between at least a first position in which the second flow of fluid is allowed to flow substantially free through the second valve and a second position in which the second flow of fluid is substantially blocked. Thus, each valve may substantially block (or allow) the respective flow.

According to one embodiment of the present invention, a flow adjusting device for a shock absorber for a vehicle is provided. The shock absorber comprises a cylinder adapted to accommodate at least a hydraulic fluid and a piston dividing said cylinder into at least a first and a second working chamber. The flow adjusting device is adapted to control at least a first damping medium flow and a second damping medium flow adapted to flow from at least one of the working chambers, wherein the flow adjusting device comprises at least a first valve, adapted to control said first flow, and a second valve, adapted to control said second flow. The first valve and the second valve are jointly adjusted. The first valve comprises at least one valve disc.

According to one embodiment of the present invention, a flow adjusting device for a shock absorber for a vehicle is provided. The shock absorber comprises a cylinder adapted to accommodate at least a hydraulic fluid and a piston dividing said cylinder into at least a first and a second working chamber. The flow adjusting device is adapted to control at least a first damping medium flow and a second damping medium flow adapted to flow from at least one of the working chambers, wherein the flow adjusting device comprises at least a first valve, adapted to control said first flow, and a second valve, adapted to control said second flow. The first valve and the second valve are jointly adjusted. The second flow is a bleed flow.

According to one embodiment, at least one of the first valve and the second valve is a bleed valve, e.g. the first valve and/or the second valve may be a valve/valves adapted to adjust a bleed flow.

According to one embodiment, the flow adjusting device comprises at least one flow adjustment element, adapted to adjust said first flow of fluid through said first valve and said second flow of fluid through said second valve simultaneously. Thus, the joined, or common, adjusting of the valve may be performed by a single adjustment means provided preferable easily accessible for the rider, preferably also during riding. Examples include a handle, a knob or the like.

Other embodiments may comprise separate adjustment means for each valve, suitably linked together, to perform the simultaneous adjustment.

According to one embodiment, the first valve and said second valve are arranged to be in the first positions simultaneously, such that the first and the second flow of fluid are simultaneously allowed to pass through said valves. A substantially free flow of fluid through both valves is desired in situation where a high degree of damping is desired, such as when comfort for the rider is prioritized when for example riding through rougher terrain.

According to one embodiment the first valve and the second valve are arranged to be in the second positions simultaneously, such that the first and the second flow of fluid are simultaneously blocked. This provides for the possibility of an efficient lock of the damper, also referred to as a so called lock-out, which efficiently results in a completely stiff behavior of the damper. This may be desirable for example when travelling uphill, or other similar situations, where energy loss due to movement of the damper is preferably avoided.

According to one embodiment, the first valve and the second valve are adjustable between a plurality of intermediate positions, between the first position and the second position respectively. In other words, both valves may be adjusted to allow for intermediate damping characteristics between the closed, or locked state, and the fully open state. This adjustment may be performed in a synchronized or joined manner, or may be performed individually for each valve. Some embodiment may include combinations wherein the settings corresponding to the fully locked first position and the fully open second position of each valve are synchronized, or joined, and the intermediate positions may be adjusted separately for each valve. This increases the versatility of the damper, since the user is allowed to adjust the damping properties to the riding situation and environment.

According to one embodiment the first valve comprises at least one valve disc provided with at least one fluid port, at least one shim and a clamp comprising at least two parallel edges. The at least one shim being arranged in connection with the clamp such that the shim, when the valve is in the first position, is adapted to deflect at least around the at least two parallel edges of said clamp such that a flow of fluid is allowed through the at least one fluid port. Thus, the fluid is allowed to pass through the fluid port by overcoming a resistance due to the deflection of the at least one shim. The design of the at least one shim may be chosen depending on the desired damping properties in terms of different materials of different stiffness, thickness of the shim as well as shape of the shim. Shapes may include a circular shape, but many other shapes are possible. Some embodiments may include a plurality of shims arranged in a so called shim stack; such a stack may include for example circular shims of variable diameter which allows for fine tuning of the resistance for the fluid flow and accordingly the damping characteristic. The at least two parallel edges is advantageous both in terms of functionality and manufacturability. Some embodiment may for example include two or more fluid ports, in such a case the two parallel edges may provide for an easy way to achieve a symmetric support of the shim with respect to the fluid ports. However, in some embodiments the clamp may be provided with only one single substantially straight edge, and the shim being arranged to deflect around said edge.

According to one embodiment, the at least one valve disc is provided with at least one fluid port, at least one shim and a clamp comprising at least two parallel edges. The at least one shim being arranged in connection with the clamp such that the shim, when the valve is in the first position, is adapted to deflect at least around the at least two parallel edges of said clamp such that a flow of fluid is allowed through the at least one fluid port. Thus, the fluid is allowed to pass through the fluid port by overcoming a resistance due to the deflection of the at least one shim. The design of the at least one shim may be chosen depending on the desired damping properties in terms of different materials of different stiffness, thickness of the shim as well as shape of the shim. Shapes may include a circular shape, but many other shapes are possible. Some embodiments may include a plurality of shims arranged in a so called shim stack; such a stack may include for example circular shims of variable diameter which allows for fine tuning of the resistance for the fluid flow and accordingly the damping characteristic. The at least two parallel edges is advantageous both in terms of functionality and manufacturability. Some embodiment may for example include two or more fluid ports, in such a case the two parallel edges may provide for an easy way to achieve a symmetric support of the shim with respect to the fluid ports. However, in some embodiments the clamp may be provided with only one single substantially straight edge, and the shim being arranged to deflect around said edge.

According to one embodiment, the clamp is rotatable between the least said first and said second position, such that a degree of deflection of the at least one shim is dependent on the position of the clamp. Thus, the degree of deflection possible and accordingly the flow area available for the fluid flow may be adjusted. This is advantageous in that the parallel edged surprisingly have been shown to provide the valve with smooth, or stepless, adjustment properties. However, embodiment wherein a stepped behavior is desired are also conceivable within the scope. Examples of shapes may include a clamp comprising at least two straight edges, such as a rectangular clamp, or a clamp comprising two straight edges and two curved edges. In the latter case, the curved edge may be designed to substantially follow the shape and dimension of the circumference of the shim, in order to provide a substantially fully blocked fluid port, i.e. a completely locked damper, since effectively no deflection of the shim will be allowed in the locked position. In a further embodiment, the clamp includes two straight edges, the edges being arranged in an angle with respect to each other.

According to one embodiment, the clamp is arranged such that a maximum deflection of the at least one shim is allowed, in the first position wherein the first flow is allowed to flow substantially free through the at least one port, and wherein, in the second position, the clamp is arranged such that a minimum deflection of the at least one shim is allowed, wherein the shim substantially blocks the first fluid flow from flowing through the at least one port. Thus, the design of the clamp provides for easy adjustability and the clamp, and accordingly the damper, may be easily adapted to the riding situation.

According to one embodiment, the clamp is rotated approximately 90° from the first position wherein the first flow is substantially free, to the second position wherein the first flow is substantially blocked. This design allows for an advantageous symmetric design of the damper, both in terms of functionality and manufacturability, as well as for simple adjustment for the user.

According to one embodiment, the clamp is substantially rectangular. A rectangular shape is advantageous for example in that it may be produced in a cost-effective manner.

According to one embodiment, the first valve is a two-port valve. The two-ports of the valve may be arranged on opposite sides with respect to a valve cross section, which may be advantageous when combined with a substantially rectangular shape clamp, due to the correspondence of symmetry between a rectangular shape and fluid ports arranged in such a way. Other embodiments may include other arrangements of fluid ports, combined with suitable clamps in order to achieve the adjustability needed. Some embodiment may include any larger number of ports when such a design is suitable for a certain application.

According to one embodiment, the first valve is an impervious valve disc pretensioned by a spring. The pretension achieved may be very accurately determined using a spring, and accordingly this embodiment allows for a precise adjustment of the damping properties. The spring may be any kind of spring, such as a coil spring or a leaf spring.

According to one embodiment, the second valve is a rotatable valve comprising a first annular member, extending along a longitudinal axis A, and a second annular member, extending along the axis A, arranged to surround the first annular member, the first annular member comprising at least a first slot and the second annular member comprising at least a second slot, the first and second annular members being arranged rotatable relative one another such that at least one variable fluid path is formed via the at least one first slot and the at least one second slot. Thus, the available flow area, and thus the resistance, for a fluid flow passing through the second valve according to this embodiment may be adjusted by means of relative rotation of the annular members.

According to one embodiment, the second fluid flow is adapted to flow through said first annular member and/or through said at least one variable fluid path.

According to one embodiment, the variable fluid path has a flow area which is dependent on an adjustable overlap of the at least one first slot and the at least one second slot. The overlapping area of the two slots gives the resulting flow area. The slots may have the same or different cross sections in terms of both shape and dimensions. In some embodiment a full overlap of slots, and accordingly slot cross section area, is possible. In other embodiment, only a limited overlap is allowed.

According to one embodiment, a predetermined first relative rotational angle between the first and second annular member corresponds to the first position, wherein a flow of fluid through the variable fluid path is substantially free, and a predetermined second relative rotational angle between the first and second annular member angle corresponds to the second position, wherein the second flow of fluid is substantially blocked. The predetermined angles of the first and second position provides for ease of adjustability, as well as ease of use for the rider.

According to one embodiment, a variable flow of fluid through the variable fluid path is allowed for a relative rotational angle between the first and second annular member in a predetermined first range comprising the first position and substantially blocked for a relative rotational angle between the first and second annular member in a predetermined second range comprising the second position. In other words, apart from the defined first and second positions, the valve allows for a variable flow through the fluid path also in a range of relative rotational positions which either encloses, or in some cases are delimited by, the defined positions. These ranges preferably correspond to a variable fluid flow simply due to the nature of the two overlapping slots forming the fluid path. This embodiment allows for an enhanced adjustability and may further be advantageous with regard to sensitivity to tolerance errors which may occur during manufacturing and/or assembly.

According to one embodiment, the first and/or the second valve is/are adjusted continuously. This allows for a smooth adjustment of properties of the damper, as well as for fine tuning of the damper exactly to the needs of the user. In another embodiment, the first and/or the second valve is/are adjusted step wise. Although, adjustability in this latter case may be described as somewhat more predetermined, this might be advantageous in that the adjustment is simplified for the user.

In one embodiment, the first and/or the second valve is/are manually adjustable. According to another embodiment, the first and/or the second valve is/are automatically adjustable.

According to another aspect of the invention, the present invention relates to a shock absorber for a vehicle comprising a flow adjusting device according to what is described above. The shock absorber comprises a cylinder adapted to accommodate at least a hydraulic fluid and a piston dividing the cylinder into a first and a second working chamber, wherein the flow adjusting device is adapted to control at least a first damping medium flow and a second damping medium flow adapted to flow from at least one of the working chambers, the flow adjusting device comprising at least a first valve, adapted to control the first flow, and a second valve, adapted to control the second flow, wherein the first valve and the second valve are jointly adjusted.

In one embodiment, the first and the second damping medium flows are damping medium flows adapted to flow between said two working chambers. The first and/or second damping medium flow may be arranged such that the flow is directed through flow ducts in the piston and/or the piston rod. In some embodiments, however the damping medium flows are arranged to flow through flow ducts in which the flow adjusting device(s) according to what has been described above may be arranged.

In one embodiment, the first and the second damping medium flows are damping medium flows adapted to flow between at least one of said first and said second working chamber and an additional reservoir. An additional reservoir is advantageous for pressurization of the damping fluid, as well as for providing a compensation for the displacement of fluid due to movement of the piston rod. Such reservoirs are well known in the art and will hence not be described in further detail.

According to one embodiment, the flow adjusting device is arranged outside the cylinder. This allows for easy access to the flow adjusting device, as well as for a compact layout for the shock absorber wherein for example the diameter of the cylinder may be kept smaller.

According to one embodiment the first flow is a main damping fluid flow, adapted to flow from at least one of the first and the second working chamber through the piston and the second fluid flow is a bleed flow, adapted to flow from at least one of the first and the second working chamber through a separate bleed flow path.

According to another aspect, the present invention relates to a front fork for a two wheeled vehicle comprising a shock absorber according to what is described above. Some embodiment may relate to a front fork for a bicycle or mountain bike.

Further objectives of, features of and advantages with the present invention will become apparent when studying the following detailed disclosure, the drawings and the appended claims. Those skilled in the art realize that different features of the present invention can be combined to create embodiments other than those described in the following.

SHORT DESCRIPTION OF THE APPENDED DRAWINGS

The invention is described in the following illustrative and non-limiting detailed description of exemplary embodiments, with reference to the appended drawings, wherein.

FIGS. 3a-e are cross sectional views of an embodiment of the second valve, wherein a variable fluid path is formed by two overlapping slots, shown in various relative rotational positions.

FIGS. 4a-e are corresponding perspective views of the second valve shown in FIGS. 3a-e.

Figure 5A:
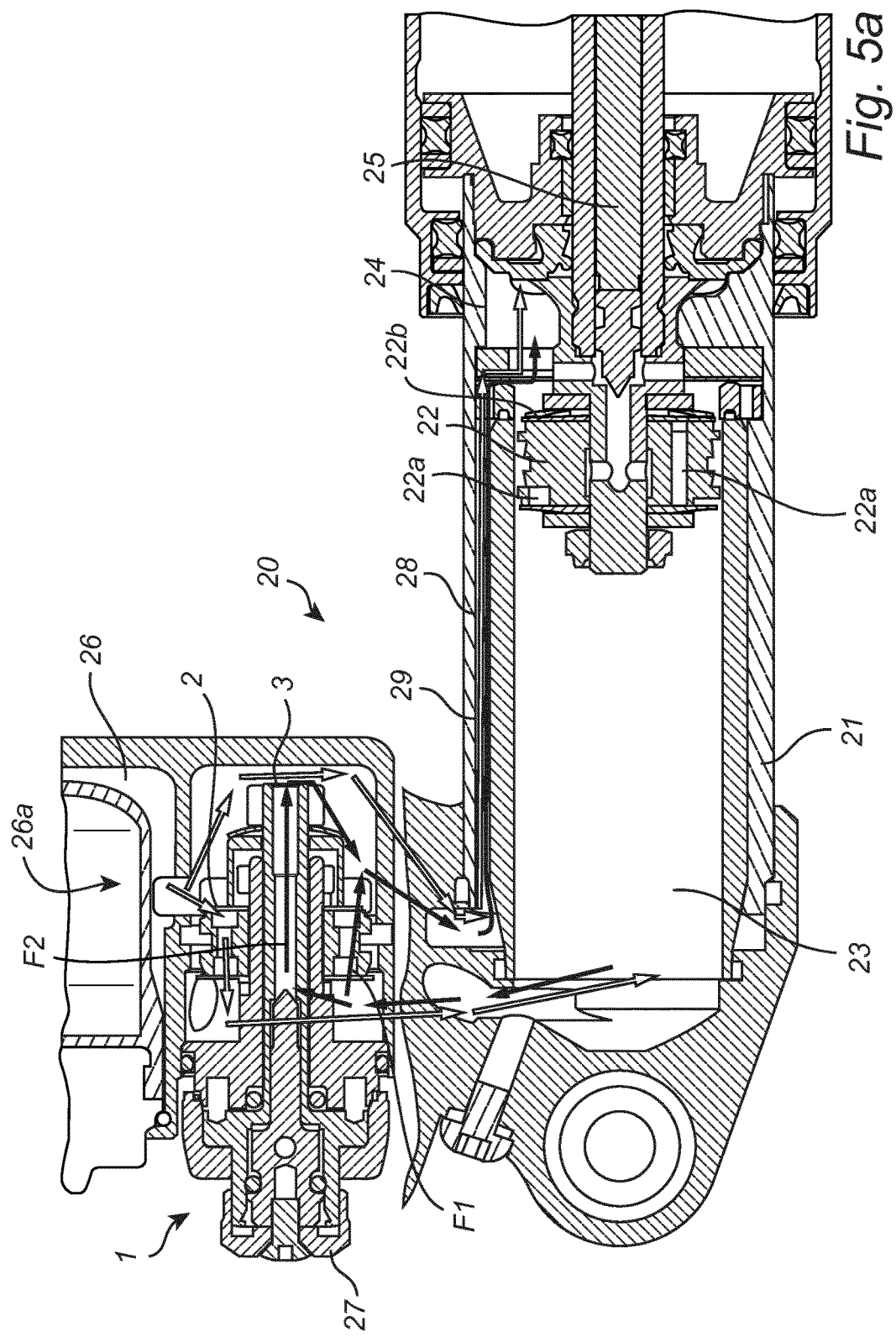

FIG. 5a is a cross sectional view of an embodiment of a shock absorber according to one aspect of the invention.

Figure 5B:
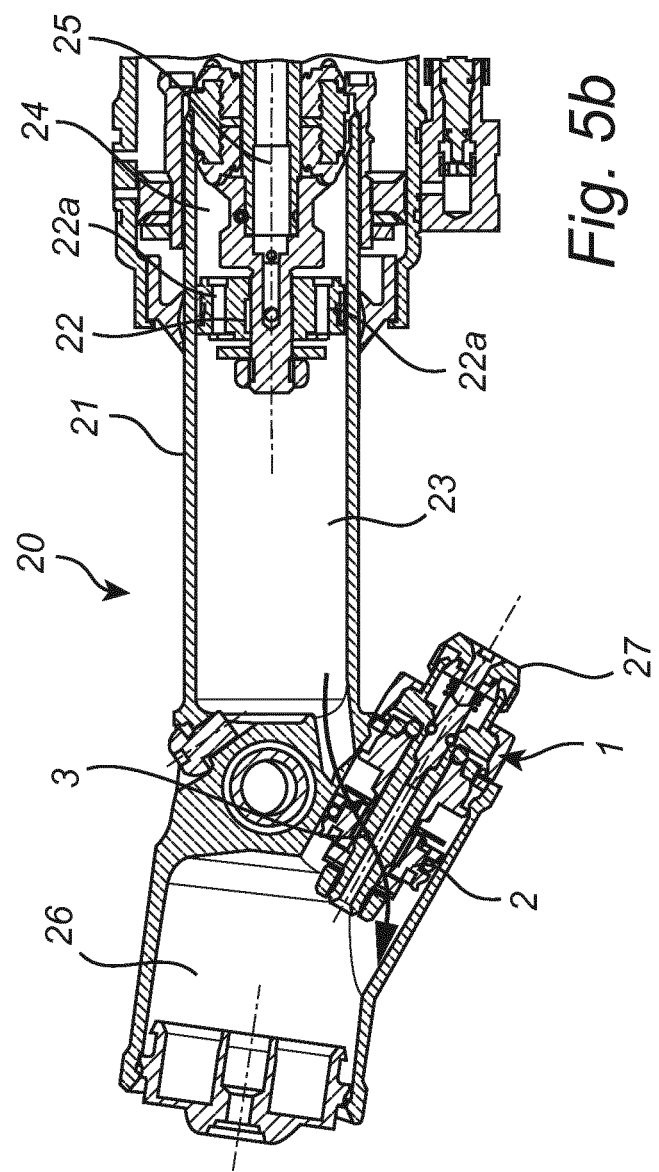

FIG. 5b is a cross sectional view of an embodiment of a shock absorber according to another aspect of the invention.

All figures are schematic, not necessarily to scale, and generally only show parts which are necessary in order to elucidate the invention, wherein other parts may be omitted or merely suggested. Throughout the figures the same reference signs designate the same, or essentially the same features.

DETAILED DESCRIPTION OF PREFERRED EMBODIMENT OF THE INVENTION

Figure 1A:
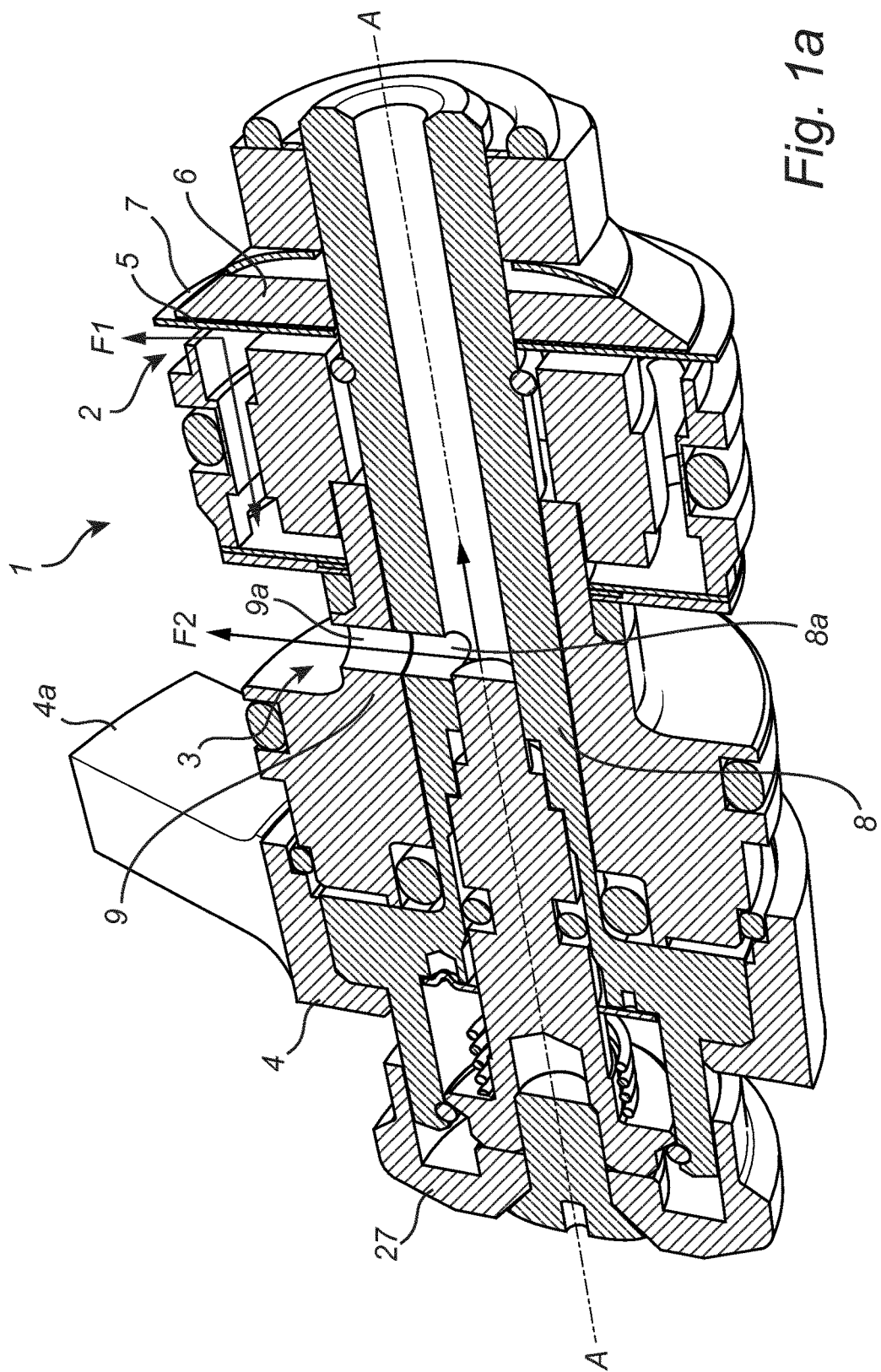
FIG. 1a is a cross sectional view of an embodiment of the flow adjusting device, shown in a position wherein the fluid passage is open.

FIG. 1a shows a flow adjusting device 1 for adjusting a first flow of fluid F1 and a second flow of fluid F2. The flow adjusting device 1 comprises a first valve 2 adapted to control the first flow F1 and a second valve 3 adapted to control the second flow F2. The device 1 further comprises a flow adjustment element 4, comprising a handle 4a, adapted to adjust the first flow F1 and the second flow F2 simultaneously. The flow adjustment element 4 may be rotated with respect to the axis AA in order to adjust the flows.

The first valve 2 comprises a two-port valve disc 5, a clamp 6 and a shim 7. The shim 7 is arranged on between the valve disc 5 and the clamp 6 such that it may deflect around the edges of the clamp 6 in order to allow the first flow F1 to pass through the ports 5a, 5b of the valve disc 5. The clamp 6 is rotatatable with respect to the axis AA, in response to a rotation of the flow adjustment element. The functionality of the first valve 2 is described in further detail with reference to FIGS. 2*a-c*.

The second valve 3 is a rotational valve, in the illustrated case with respect to the axis AA, and comprises a first annular member 8, in the illustrated case an elongated inner component 8, and a second annular member 9, in this case an outer component 9, which is arranged such that it at least partly surrounds the first annular member 8. The elongated component 8 and the outer component 9 are arranged such that a relative rotation there between may take place. The elongated inner component 8 further comprises a first, or an inner, slot 8*a* and the outer component 9 comprises a second, or outer, slot 9*a*. The inner slot 8*a* and the outer slot 9*a* together form a variable fluid path 8*a*, 9*a*, the flow area of the fluid path depending on the relative rotation between the elongated inner component 8 and the outer component 9. Accordingly, when the outer component 9 is rotated with respect to, or around, the inner component 8 the cross sections of the inner slot 8*a* and the outer slot 9*a* may either align perfectly resulting in a maximized flow area of the fluid path 8*a*, 9*a* not align at all resulting in a minimized flow area, or in effectively interrupting the fluid path completely, or any intermediate state there between of a partial overlap between the slots 8*a*, 9*a*. The functionality of the first valve 2 is further described in detail with reference to FIGS. 3*a-b*.

The joint, or simultaneous, adjustment of the first valve 2 and the second valve 3 is achieved utilizing the flow adjustment element 4. To adjust the first valve 2 and the second valve 3, the adjustment element 4 is turned utilizing the handle 4*a* thereby performing a rotational motion with respect to axis AA. In order to achieve this effect, the inner elongated component 8 of the second valve 3, and the clamp 6 of valve 2 are both attached to the flow adjustment element 4, such that all three components 4, 6, 8 may be turned simultaneously.

Figure 1B:
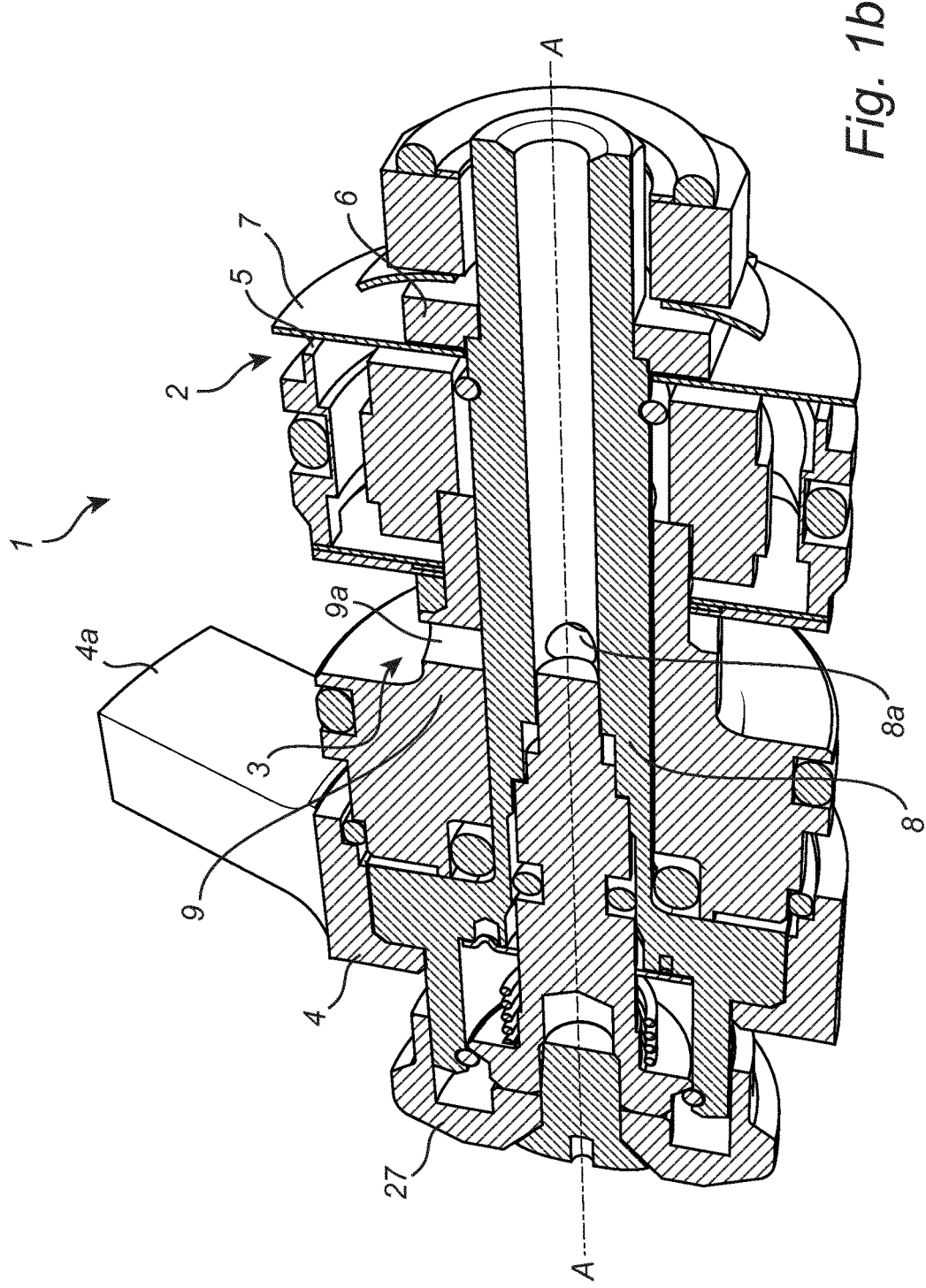
FIG. 1b is a cross sectional view of the flow adjusting device of FIG. 1a shown in a position wherein the fluid passage is closed.

FIG. 1*b* shows the result after handle 4, and thereby inner component 8 and clamp 6, have been turned approximately 90° with respect to the axis AA. The clamp 6 has been turned such that deflection of the shim 7 is substantially prohibited and the variable fluid path 8*a*, 9*a* of valve 3 is closed since the two slots 8*a* and 9*a* no longer overlap. In other words, FIG. 1*b* shows a locked stated of the device which is referred to in the art as a "lock-out."

In the embodiment illustrated in FIGS. 1*a-b*, the first flow F1 through the first valve 2 may be described as the main damping fluid flow and the second fluid flow F2 may be described as a bleed flow.

Figure 2A:
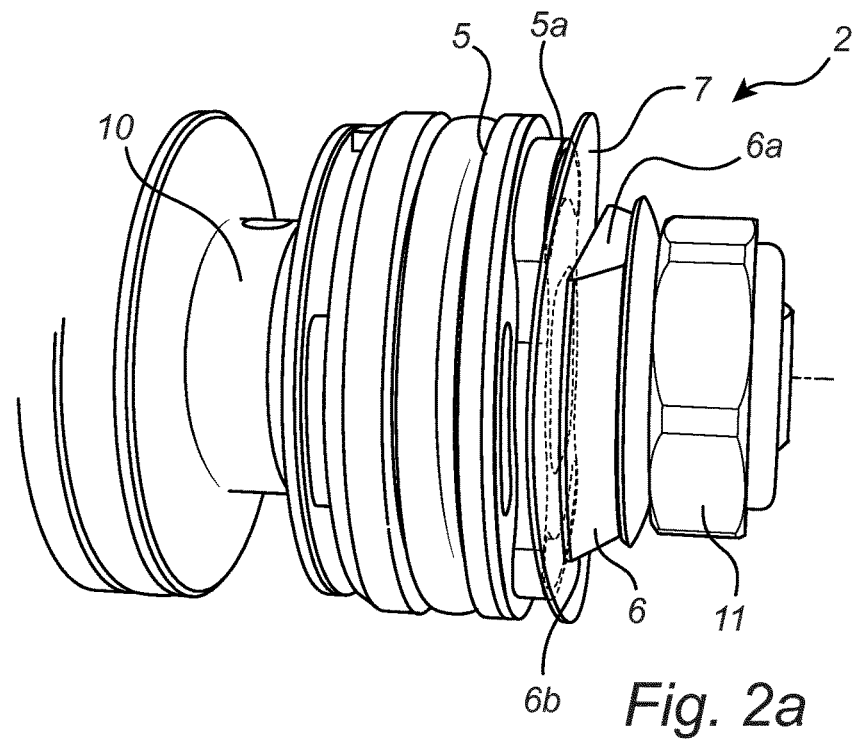
FIG. 2a shows an embodiment of the first valve in an open state wherein a flow of fluid is allowed.
Figure 2B:
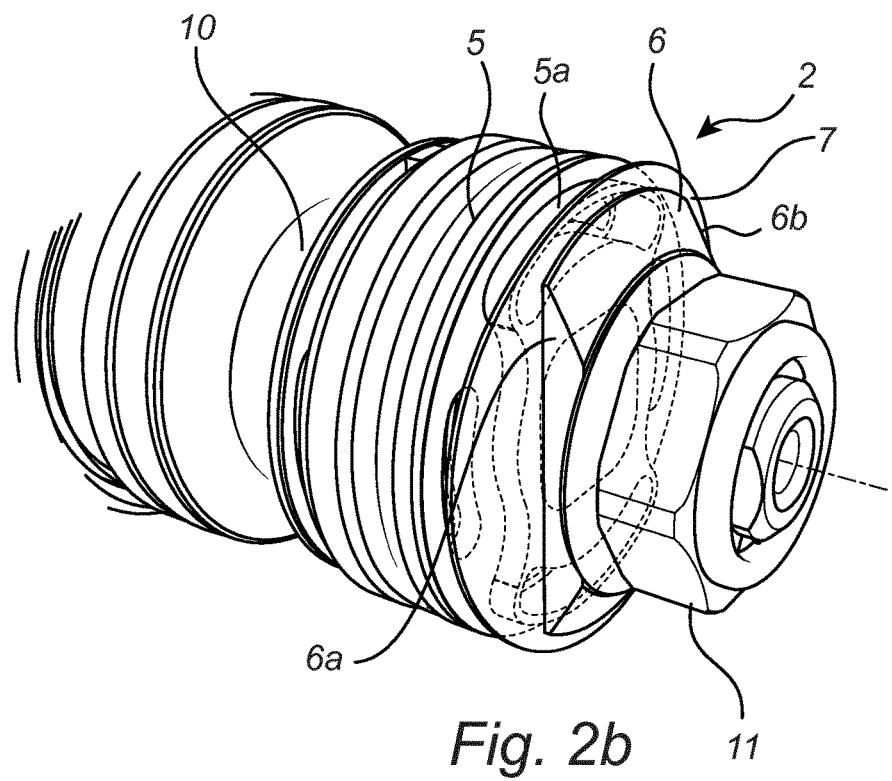
FIG. 2b shows the embodiment of the first valve of FIG. 2a, in a closed state wherein a flow of fluid is substantially hindered.

FIG. 2*a* is a detailed view of the first valve 2. The two-port valve disc 5, the shim 7 and the clamp 6 are arranged subsequently on a shaft, 10. A fixing bolt 11 is arranged on the shaft 10 in order to hold the assembly 5, 7, 6 in place. The illustrated clamp 6 has a somewhat rectangular shape, comprising two parallel edges 6*a*, 6*b*, and the shim 7 is arranged to deflect over the edges 6*a*, 6*b*. Shims are well known in the art and may be chosen according to the specific needs of a particular adjustment device 1 in terms of design parameters such as thickness, diameter and materials such that a proper resistance to deflection and thereby a proper damping is achieved. The illustrated shim 7 has a thin washer like structure.

The valve 2 is in FIG. 2*a* illustrated in the open, or first, position FV1 wherein the first fluid flow may flow substantially free through the valve 2. The shim 7 is shown in a deflected state, wherein the shim deflects over the edges 6*a*, 6*b*. To achieve the closed, or locked, state FV2 of the valve shown in FIG. 2*b*, the clamp 6 is turned approximately 90°, such that the deflection of the shim 7 is effectively hindered and consequently also the flow through ports 5*a*. This movement is performed using the handle 4 as described in connection with FIGS. 1*a-b* above.

Figure 2C:
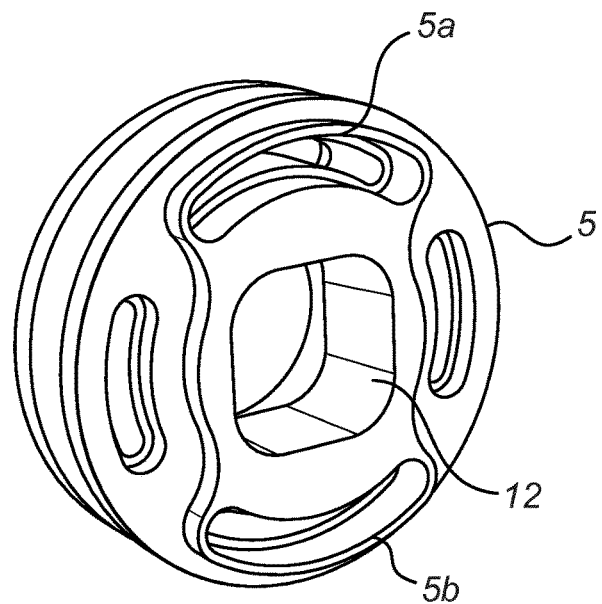
FIG. 2c shows an embodiment of the valve disc of the first valve.

FIG. 2*c* is a detailed view of the valve disk 5. In the illustrated case, the valve disc 5 is a two-port valve. Fluid ports 5*a*, 5*b* are shown arranged at approximately 180° spacing in the valve disc 5. Other embodiment may include other arrangements. Further, the valve disc 5 comprises a square hole 12, which is provided to achieve a non-rotating attachment of the valve disc 5 onto shaft 10.

Figure 2D:
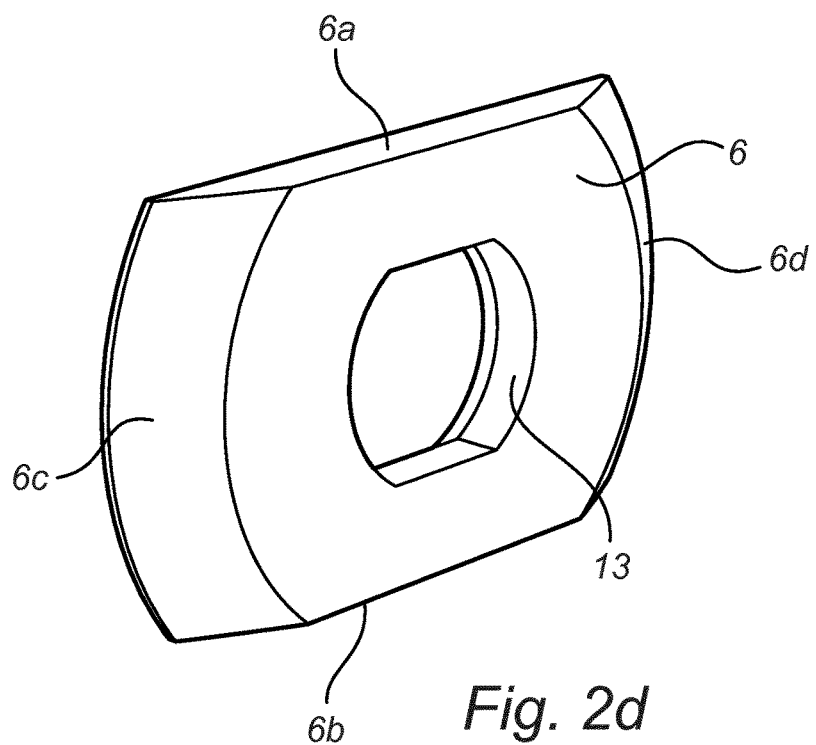
FIG. 2d shows an embodiment of the clamp of the first valve.

FIG. 2*d* is a detailed view of the clamp 6 and in the illustrated case shows a clamp 6 with a somewhat rectangular shape. The two edges 6*a*, 6*b* are substantially parallel, and substantially straight, and the two remaining edges 6*c*, 6*d* are rounded in accordance with the radius of the valve disc 5. Many other shapes are however possible within the scope of the invention, such as a clamp having only one single substantially straight edge and for the rest being rounded in accordance with the radius of the valve disc 5, or a clamp provided with two edges being not completely parallel but arranged in an angle relative to each other. Further, the clamp 6 comprises a square hole 13, which is provided to provide a non-rotating attachment of the clamp 6 onto shaft 10.

However, the design of the dimensions of the clamp is chosen to match those of the valve disc 5 and the arrangement of fluid ports 5*a*, 5*b* as well as to achieve the desired valve characteristics. The distance from the center of the square hole 13 to the edges 6*a*, 6*b* is chosen to allow a sufficient deflection of the shim 7 in the open, or first, position FV1 of the valve whereas the distance from the center of the hole 13 to the edges 6*c*, 6*d* is chosen to hinder the deflection of the shim in the closed, or second, state FV2 of the valve 2. Hence, the interaction between the shim 7, the positioning of fluid ports 5*a*, 5*b* and the shape and dimensions of the clamp 6 allows for the design of an adjustable valve 2 suitable for a wide variety of applications.

Figure 3B:
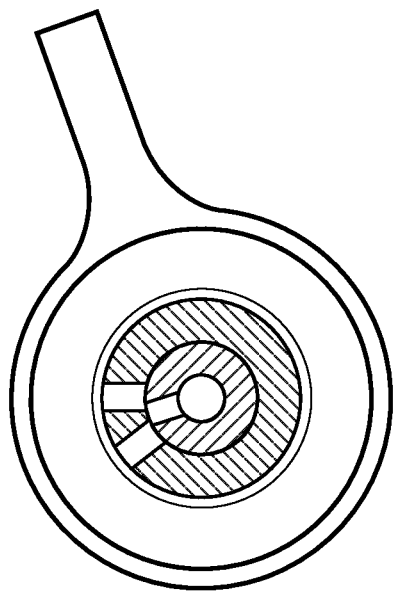
Figure 3A:
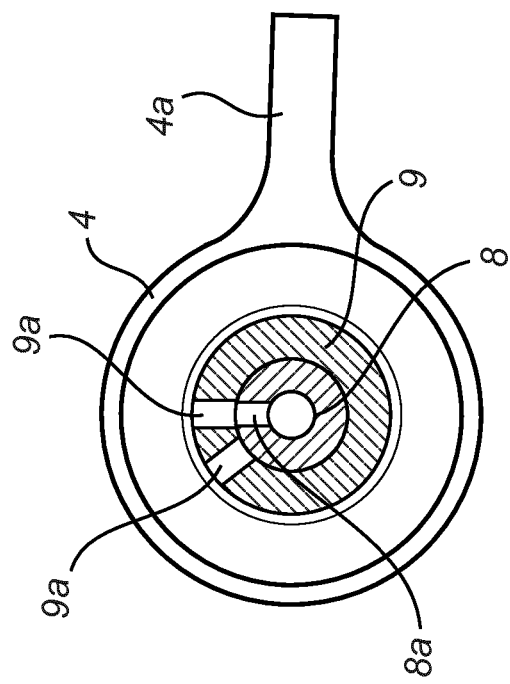
Figure 3C:
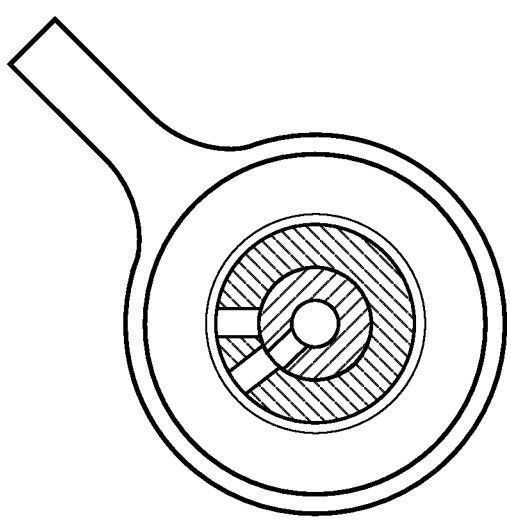
Figure 3D:
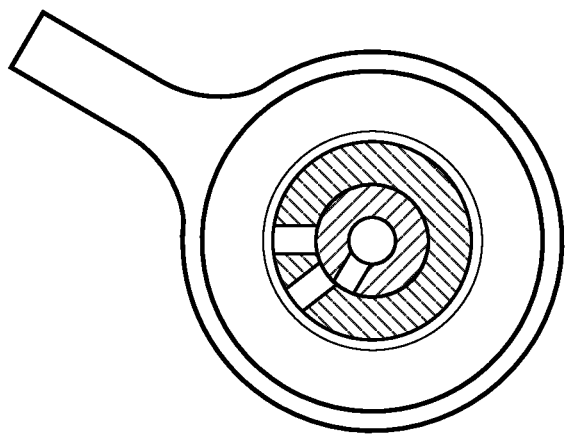
Figure 3E:
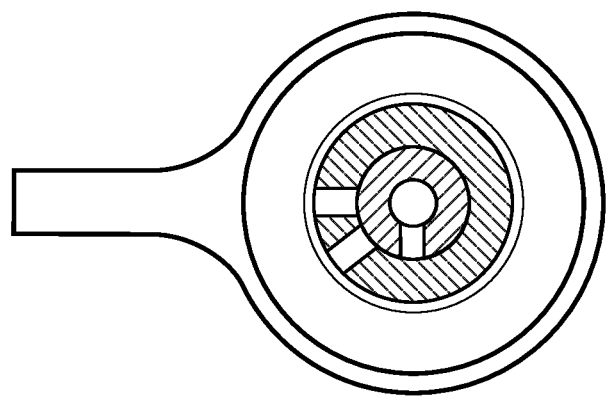
Figure 4A:
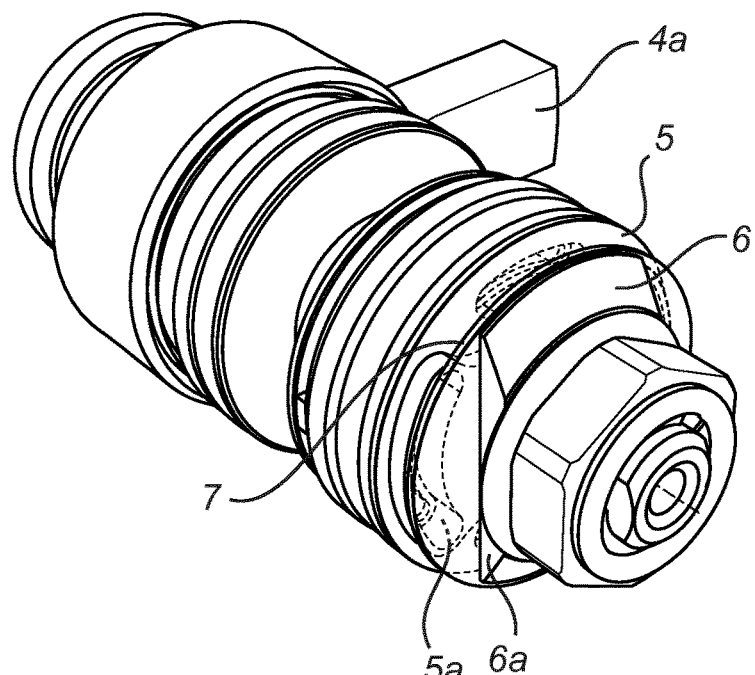
Figure 4B:
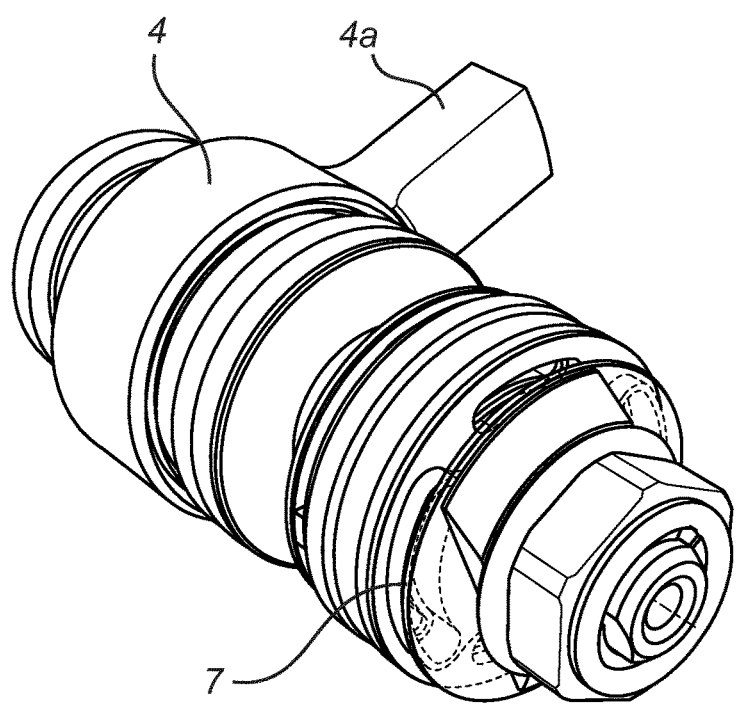
Figure 4C:
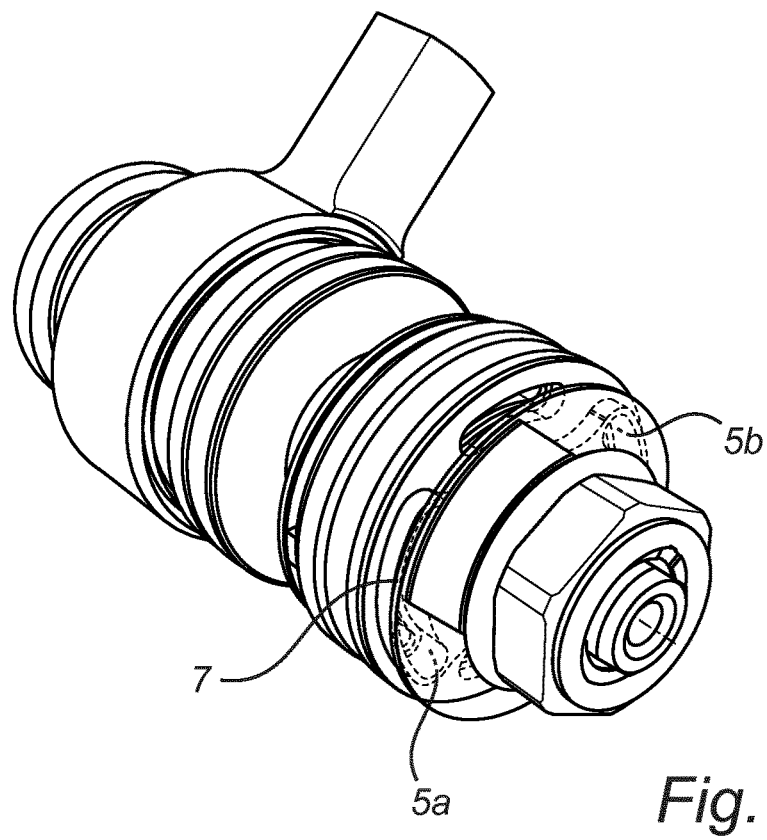
Figure 4D:
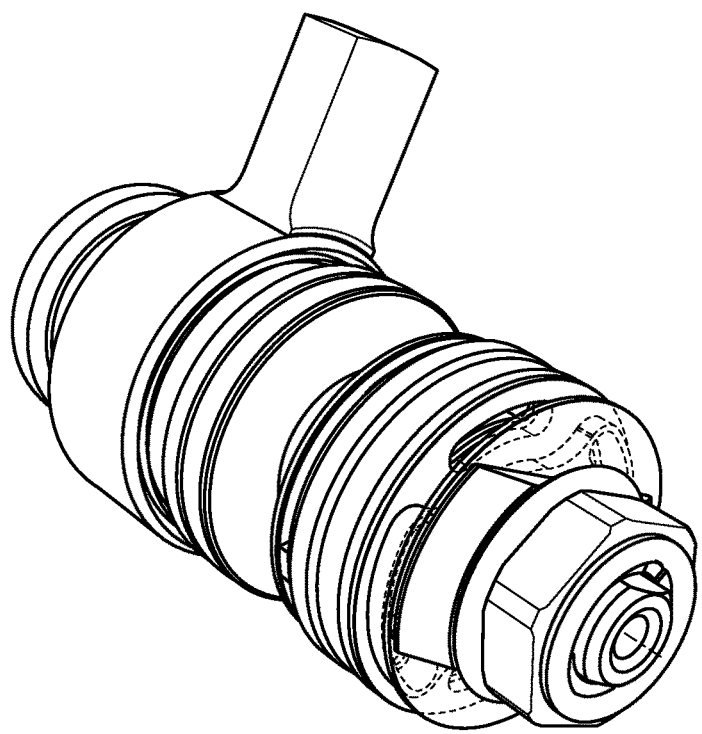
Figure 4E:
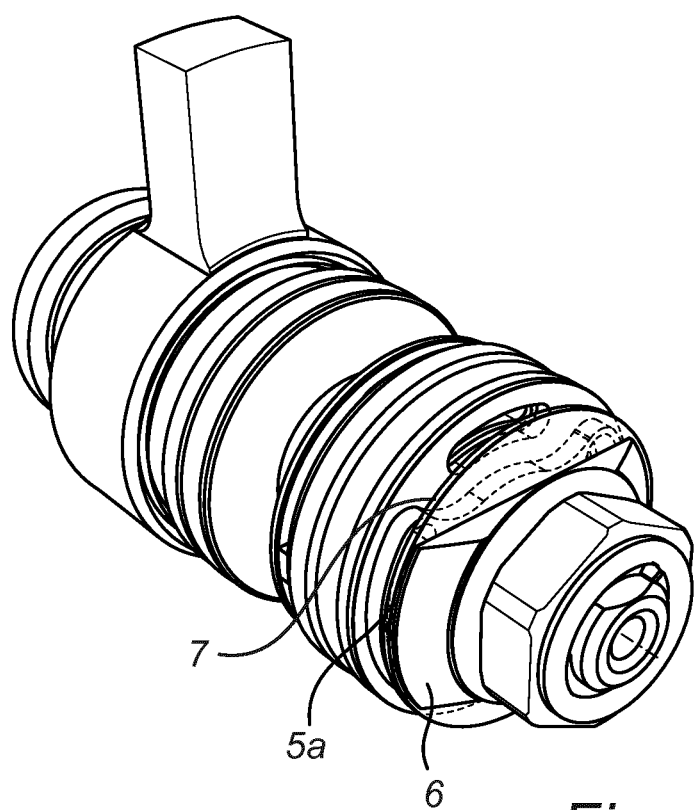

FIG. 3*a-e* are cross sectional views of the second valve 3. In the illustrated case, the rotational valve 3 comprises an inner component 8 and an outer component 9. The inner component 8 comprises a first fluid path 8*a* and the outer component 9 comprises second fluid paths 9*a*, in the illustrated case two second fluid paths. Other combinations of the number of first and second fluid paths are off course conceivable within the scope of the invention. FIG. 3*a* shows the valve in the fully open position, SV1, wherein the second flow of fluid F2 is allowed to flow substantially free through the valve 3. In the illustrated case, this corresponds to a reference position in which the relative rotational angle between inner component 8 and outer component 9 is equal to approximately 0°. As shown in FIG. 3*a*, the fluid paths 8*a* and 9*a* are substantially aligned. FIG. 3*a* further shows the flow adjustment element 4 and the handle 4*a*, in the illustrated case arranged to surround the valve arrangement, the flow adjustment element 4 is adapted to jointly adjust the flow through the first valve 2 and the second valve 3. FIGS. 3*b-c* shows intermediate positions wherein the relative rotational angle between components 8 and 9 is such that the slots 8*a*, 8*b* partially overlap thereby reducing the area of the variable fluid path 8*a*, 9*a* but still allowing a flow of fluid F2 through the valve 3. The relative rotational angle between the inner component and the outer component is preferably adjusted with a knob 27 (see FIGS. 1*a* and 1*b*). Thus, the knob 27 is interconnected with one of said inner and outer components 8, 9. FIG. 3*e* shows a position wherein the relative rotational angle between components 8, 9 is such that the slots 8*a* and 9*a* no longer overlap. Hence, FIG. 3*e* corresponds to the locked, or second, position SV2 of the second valve 3. FIGS. 4a-e are corresponding perspective views of the second valve 3 shown in FIGS. 3a-e.

FIG. 5a is a cross sectional view of a complete shock absorber 20 comprising a flow adjusting device 1 according to what has been previously described above. In this case, the illustrated shock absorber 20 is a so called TTX-damper comprising two tubes, a damping tube, i.e. a cylinder 21, and an outer tube 28 that is arranged around the cylinder 21, that together form a damping system. The system creates a double tube function in which the damping medium can flow in parallel as a result of the duct 29 between the cylinder 21 and the outer tube 28. Thus, the shock absorber comprises a cylinder 21, in the illustrated case filled with a hydraulic fluid and a piston 22 dividing the cylinder into a first working chamber 23 and a second working chamber 24. The piston 22 is arranged on a piston rod 25 and comprises fluid channels 22a and shims 22b. The shock absorber 20 further comprises an additional reservoir 26, arranged externally of the cylinder 21. The additional reservoir 26 comprises a pressurizing gas volume 26a.

The flow adjusting device 1 is arranged in a location adjacent to the cylinder 21, and in fluid communication with the working chambers 23, 24. The device 1 is adapted to control at least a first damping medium flow and a second damping medium flow adapted to flow from at least one of said working chambers 23, 24. The flow adjusting device comprises a first valve 2, adapted to control the first flow F1, and a second valve 3, adapted to control the second flow F2. The first valve 2 and the second valve 3 are jointly adjusted using the flow adjustment element 4, in the illustrated case a handle 4a which may be turned in order to adjust the valves 2, 3 jointly. Furthermore, the flow through the second valve 3 is separately adjusted with a knob 27. When turing the knob 27 the relative positions between the inner component 8, comprising a first fluid path 8a, and the outer component 9, comprising a second fluid paths 9a, is adjusted, such that said first fluid path 8a and the second fluid path 9a becomes more or less aligned with respect to each other. Thereby, the flow through the second valve 3 is adjusted. The more the first fluid path 8a and the second fluid path 9a are aligned, the greater damping medium flow is allowed through the second valve 3. Advantageously, the second valve 3 thereby is stepless adjustable.

FIG. 5b is a cross sectional view of another embodiment of a complete shock absorber 20 comprising a flow adjusting device 1 according to what has been previously described above. The shock absorber comprises a cylinder 21, in the illustrated case filled with a hydraulic fluid and a piston 22 dividing the cylinder into a first working chamber 23 and a second working chamber 24. The piston 22 is arranged on a piston rod 25 and comprises fluid channels 22a and shims 22b.

Also in this case, the flow adjusting device 1 is arranged in a location adjacent to the cylinder 21, and in fluid communication with the working chamber 23. The device 1 is adapted to control at least a first damping medium flow and a second damping medium flow adapted to flow from said working chamber 23 to an additional reservoir 26. The flow adjusting device comprises a first valve 2, adapted to control the first flow, and a second valve 3, adapted to control the second flow. The first valve 2 and the second valve 3 are jointly adjusted using the adjustment element 4, in the illustrated case a handle 4a which may be turned in order to adjust the valves 2, 3 jointly. The flow adjusting device 1 further comprises a knob 27 which is adapted to adjust the flow through the second valve 3 separately (as described above in connection with FIGS. 3a-3e and 4a-4e). The shock absorber further comprises a check valve arranged between the additional reservoir and the working chamber 23, which allows flow from the additional reservoir 26 to the working chamber 23 during the return stroke.

While specific embodiments have been described, the skilled person will understand that various modifications and alterations are conceivable within the scope as defined in the appended claims.

The invention claimed is:

1. A flow adjusting device (1) for a shock absorber for a vehicle, said shock absorber comprising a cylinder (21) adapted to accommodate at least a hydraulic fluid and a piston (22) dividing said cylinder into at least a first and a second working chamber (23, 24), said flow adjusting device comprising at least a first valve (2), adapted to control a first damping medium flow (F1) and a second valve (3) that is a bleed flow valve, adapted to control a second damping medium flow (F2) that is a bleed flow;

wherein said first valve and said second valve may be jointly adjusted; and wherein i) said first damping medium flow and said second damping medium flow are both configured to flow from said first working chamber, and said second damping medium flows through a bleed flow path that is separate from said first flow path, or ii) said first damping medium flow and said second damping medium flow are both configured to flow from said second working chamber, and said second damping medium flows through a bleed flow path that is separate from said first flow path.

2. The flow adjusting device according to claim 1, wherein said first valve is adjustable between at least a first position (FV1) in which the first flow of fluid is allowed to flow substantially free through said first valve and a second position (FV2) in which the first flow of fluid is substantially blocked from flowing through said first valve, and said second valve is adjustable between at least a first position (SV1) in which the second flow of fluid is allowed to flow substantially free through said second valve and a second position (SV2) in which the second flow of fluid is substantially blocked.

3. The flow adjusting device according to claim 2, wherein said first valve and said second valve are arranged to be in said first positions (FV1, SV1) simultaneously, such that said first and said second flow of fluid are simultaneously allowed to pass through said valves.

4. The flow adjusting device according to claim 2, wherein said first valve and said second valve are arranged to be in said second positions (FV2, SV2) simultaneously, such that the first and the second flow of fluid are simultaneously blocked.

5. The flow adjusting device according to claim 2, wherein said first valve and said second valve are adjustable between a plurality of intermediate positions, between said first position (FV1, SV1) and said second position (FV2, SV2) respectively.

6. The flow adjusting device according to claim 1, wherein said second valve is a rotatable valve comprising a first annular member (8), extending along a longitudinal axis A, and a second annular member (9), extending along said axis A, arranged to surround said first annular member, said first annular member comprising at least a first slot (8a) and said second annular member comprising at least a second slot (9a), said first and second annular members being arranged rotatably relative one another such that at least one variable fluid path is formed via the at least one first slot and the at least one second slot.

7. The flow adjusting device according to claim 6, wherein said second fluid flow is adapted to flow through said first annular member and/or through at least one variable fluid path.

8. The flow adjusting device according to claim 7, wherein said variable fluid path has a flow area which is dependent on an adjustable overlap of said at least one first slot and said at least one second slot.

9. The flow adjusting device according to claim 6, wherein a predetermined first relative rotational angle between said first and second annular member corresponds to said first position (SV1), wherein a flow of fluid through said variable fluid path is substantially free, and a predetermined second relative rotational angle between said first and second annular member angle corresponds to said second position (SV2), wherein said second flow of fluid is substantially blocked.

10. The flow adjusting device according to claim 9, wherein a variable flow of fluid through said variable fluid path is allowed far a relative rotational angle between said first and second annular member in a predetermined first range comprising said first position (SV1) and substantially blocked for a relative rotational angle between said first and second annular member in a predetermined second range comprising said second position (SV2).

11. The flow adjusting device according to claim 1, wherein said first valve comprises at least one valve disc (5) provided with at least one fluid port (5*a*), at least one shim (7) and a clamp (6) comprising at least two parallel edges (6*a*, 6*b*), said at least one shim being arranged in connection with said clamp such that said shim, when said valve is in said first position, is adapted to deflect at least around said at least two parallel edges of said clamp such that a flow of fluid is allowed through said at least one fluid port.

12. The flow adjusting device according to claim 11, wherein said clamp is rotatable between at least said first and said second position, such that a degree of deflection of said at least one shim is dependent on the position of the clamp.

13. The flow adjusting device according to claim 11, wherein, in said first position (FV1), said clamp is arranged such that a maximum deflection of said at least one shim is allowed, wherein said first flow is allowed to flow substantially free through said at least one port, and wherein, in said second position (FV2), said clamp is arranged such that a minimum deflection of said at least one shim is allowed, wherein said shim substantially blocks said first fluid flow from flowing through said at least one port.

14. The flow adjusting device according to claim 11, wherein said clamp is rotated approximately 90° from said first position (FV1) wherein said first flow is substantially free, to said second position (FV2) wherein said first flow is substantially blocked.

15. A shock absorber (20) for a vehicle comprising a flow adjusting device according to claim 1, said shock absorber comprising
    a cylinder (21) adapted to accommodate at least a hydraulic fluid;
    a piston (22) dividing said cylinder into a first and a second working chamber (23, 24), wherein said flow adjusting device is adapted to control at least a first damping medium flow and a second damping medium flow adapted to flow from at least one of said working chambers, wherein said first damping medium flow and said second damping medium flow are in parallel with each other, said flow adjusting device comprising at least a first valve, adapted to control said first flow, and a second valve, adapted to control said second flow, wherein said first valve and said second valve may be jointly adjusted.

16. The shock absorber according to claim 15, wherein said first and said second damping medium flows are damping medium flows adapted to flow between said two working chambers.

17. The shock absorber according to claim 15, wherein said first and said second damping medium flows are damping medium flows adapted to flow between at least one of said first and said second working chamber and an additional reservoir.

18. A front fork for a two wheeled vehicle comprising a shock absorber according to claim 15.

19. The flow adjusting device according to claim 1, wherein said flow adjusting device comprises at least one flow adjustment element (4), adapted to adjust said first flow of fluid through said first valve and said second flow of fluid through said second valve simultaneously.

\* \* \* \* \*

UNITED STATES PATENT AND TRADEMARK OFFICE
CERTIFICATE OF CORRECTION

PATENT NO. : 10,584,760 B2
APPLICATION NO. : 15/526675
DATED : March 10, 2020
INVENTOR(S) : Leif Gustafsson Vallander et al.

It is certified that error appears in the above-identified patent and that said Letters Patent is hereby corrected as shown below:

In the Claims

Column 13, Line 23 Claim 10: "path is allowed far a relative rotational angle between said" should be – path is allowed for a relative rotational angle between said –

Signed and Sealed this
Twenty-ninth Day of December, 2020

Andrei Iancu
*Director of the United States Patent and Trademark Office*